United States Patent [19]

Nicol

[11] Patent Number: 5,233,817
[45] Date of Patent: Aug. 10, 1993

[54] CUTTER ANNEX TO CUTTER HEAD OF LAWN MOWER

[76] Inventor: Alexander N. Nicol, 102-104 Dampier Street, Barellan Point, Queensland 4306, Australia

[21] Appl. No.: 989,885

[22] Filed: Dec. 10, 1992

Related U.S. Application Data

[63] Continuation of Ser. No. 809,918, Dec. 20, 1991, abandoned.

[30] Foreign Application Priority Data

Dec. 21, 1990 [AU] Australia .................. PK4025

[51] Int. Cl.⁵ .................. A01D 34/66; A01D 34/86
[52] U.S. Cl. .................. 56/6; 56/14.7
[58] Field of Search .................. 56/6, 13.5, 14.7, 15.9, 56/DIG. 10

[56] References Cited

U.S. PATENT DOCUMENTS

| | | | |
|---|---|---|---|
| 3,500,619 | 3/1970 | Bacon | 56/6 |
| 3,543,490 | 12/1970 | Erickson | 56/14.7 X |
| 5,067,581 | 11/1991 | Nicol | 180/254 |
| 5,079,926 | 1/1992 | Nicol | 56/12.7 |

FOREIGN PATENT DOCUMENTS 6500370  7/1966  Netherlands .................. 56/6

Primary Examiner—David J. Bagnell
Attorney, Agent, or Firm—Cushman, Darby & Cushman

[57] ABSTRACT

An attachment apparatus for a cutter head is provided which includes a pair of brackets located on the cutter head having holes located therein. A pair of pins are located at one side of a pair of cutter annexes which enable the annexes to be fitted onto the cutter head. The annexes each include a frame with a pair of wheels. The annexes are able to pivot about the axis of the pins.

4 Claims, 4 Drawing Sheets

CUTTER ANNEX TO CUTTER HEAD OF LAWN MOWER

This is a continuation of application Ser. No. 07/809,918, filed on Dec. 20, 1991, which was abandoned upon the filing hereof.

The present invention relates to motor mowers, and in particular to a cutter annex to a cutter head of a motor mower which substantially increases the grass cutting area of the motor mower.

"Ride-on" motor mowers of the type where the cutter head is an attachment to either the front, rear or side of a tractor chassis can have extensions or annexes to the cutter head to provide a greater cutting area for each run of the motor mower.

However, existing attachment devices are complex in their arrangement and the ways of operating the blades within the extensions of the cutter head does not allow for the attachments or annexes to be easily attached or removed. The complexities of known attachment devices also does not allow for the attachments or annexes to follow the terrain of the grass being mowed.

(a) without the use of automatic drive belt adjusting devices and/or (b) still maintain an overlap between the lawn cutting blades of both the annex and the main cutter head.

It is an object of the present invention to provide a cutter annex to a cutter head which greatly simplifies the use of the cutter annex.

It is another object of the present invention to provide an improved cutter annex which is easy to attach and remove.

According to one aspect of the present invention there is disclosed attachment apparatus to a cutter head, said apparatus comprising a frame having attachment means to pivotally attach the frame to said cutter head, said frame having wheels to support said frame above ground level, said frame having a cutter means operable by means of a pulley apparatus from a separate cutter means on said cutter head, wherein said pulley apparatus operates the cutter means of said frame over a variable range of angles as the frame pivots about the axis of the attachment means.

One embodiment of the present invention will now be described with reference to the drawings in which FIG. 1 is a perspective view of a motor mower having a cutter head with the attachment apparatus or cutter annex attached thereto of the preferred embodiment.

Figure 1:
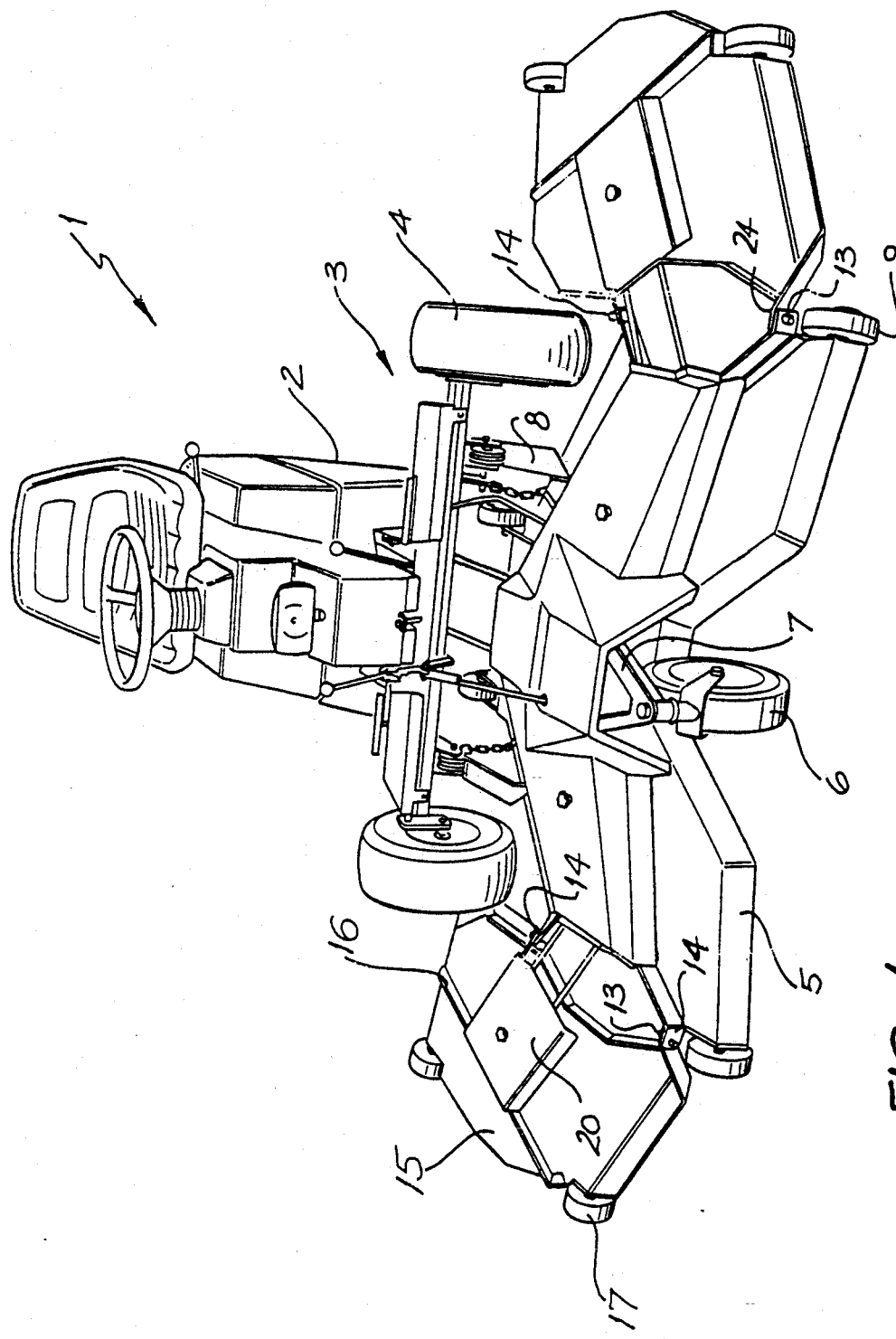
Figure 2:
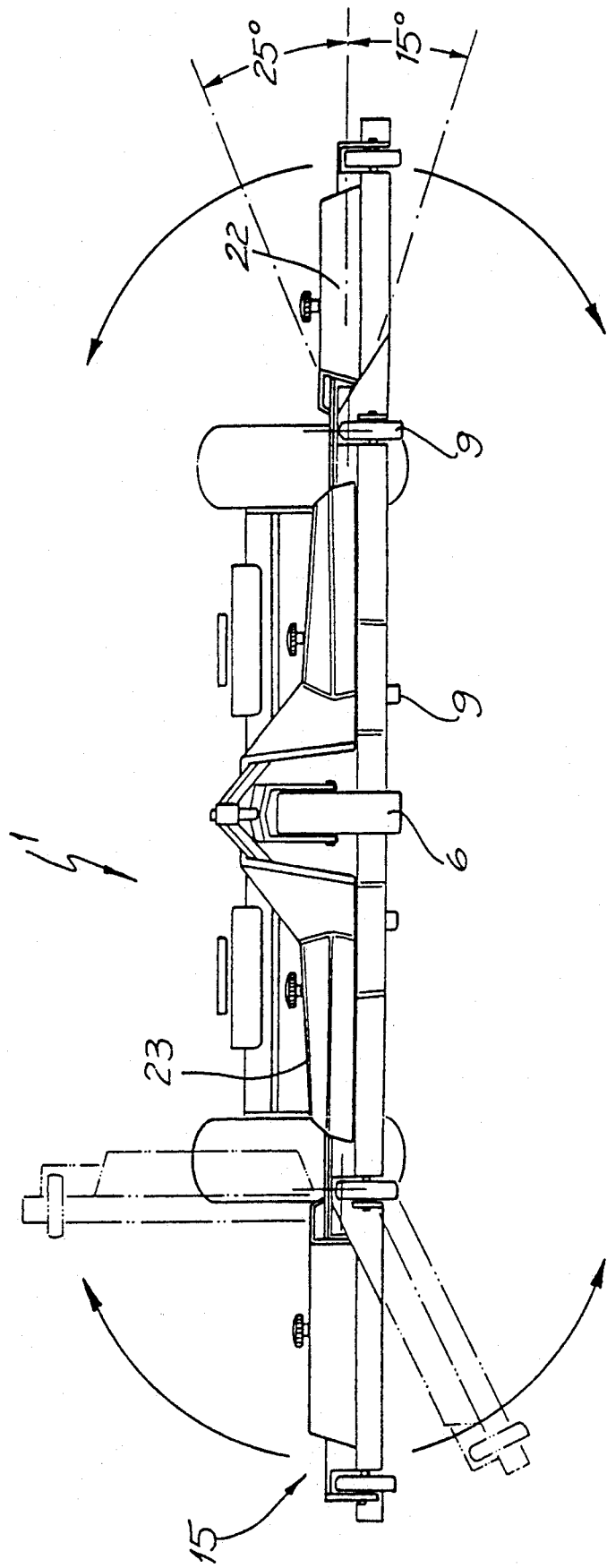
FIG. 2 is a front view of the motor mower of FIG. 1.

The apparatus of the preferred embodiment is applicable to a tractor vehicle 1 having a body 2 is attached to a tractor chassis 3 and a pair of front wheels 4 and a single rear steering/drive wheel (not illustrated) are mounted on the tractor chassis 3. A cutter head 5 is attached to the front of the tractor chassis 3 and has a jockey wheel 6 attached to the front thereof by means of a pair of struts 7. The cutter head 5 is attached by a pair of arms 8 and is able to be pivoted about these arms 8. The cutter head 5 is arranged as per U.S. Pat. No. 5,079,926 and is able to be pivoted as well as varying the height of the cutting head 5 according to the terrain being cut. As seen in FIG. 1 and FIG. 2, the cutter head 5 has a pair of wheels 9 to keep the cutter head 5 of the ground.

Figure 3:
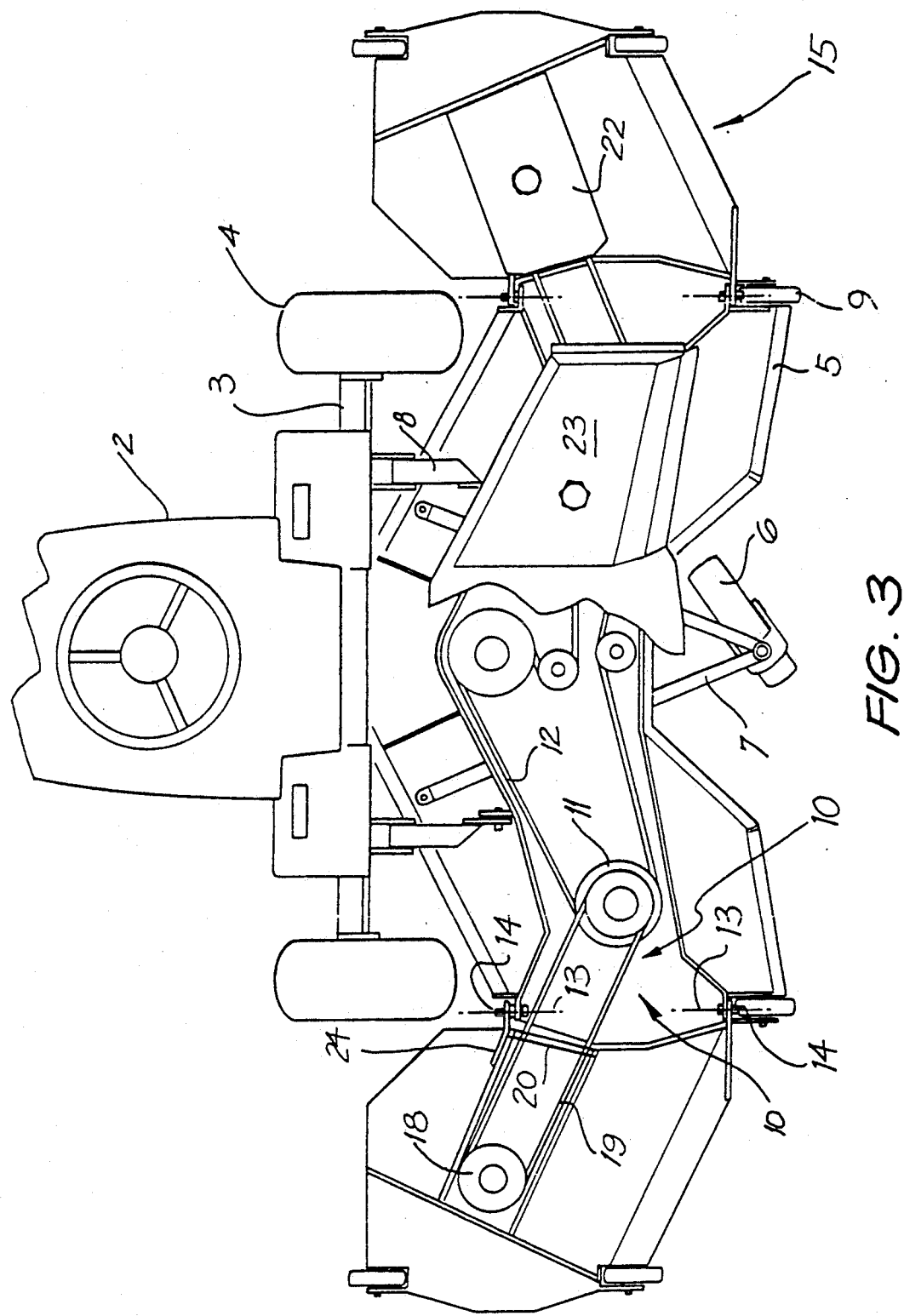
FIG. 3 is a cut away plan view of the motor mower of FIG. 1.

As illustrated in FIG. 3, a pulley system 10 is used to power the pair of cutting devices (not illustrated) located underneath the cutter head 5. The pulleys 11 are operated by a belt 12. In the embodiment illustrated the pulley 11 has a pair of tracks located thereon.

Figure 4:
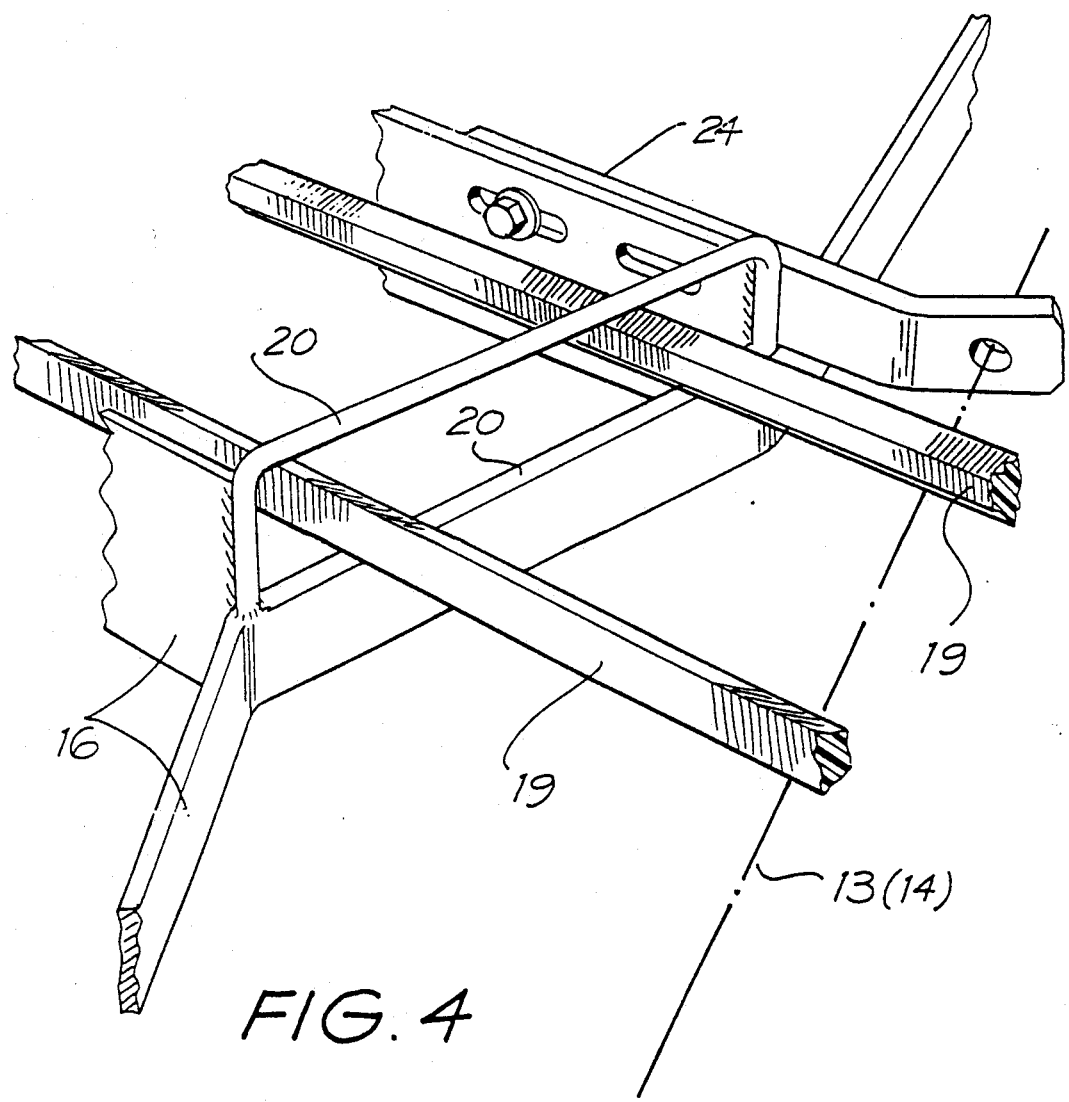
FIG. 4 is a perspective view of the annex and rectangular belt guide.

Located at each of the outside edges of the cutter head 5 is a pair of brackets 24 having holes 13 located therein. A pair of pins 14 are located at one side of a pair of cutter annexes 15 whereby the cutter annex 15 is easily connected to the cutter head 5. A sliding adjustment bracket 21 (see FIG. 4) connects the cutter annex 15 to the rear pivot pin 14. The cutter annex 15 has a frame 16 with a pair of wheels 17 attached thereto. The wheels 17 provide clearance from the ground. The annex 15 is able to pivot about the axis of the pins 14 in connection with the cutter head 5.

As seen in FIG. 3, a pulley 18 is connected by a belt 19 to the pulleys 11 to thereby operate the cutting device (not illustrated) of the cutter annexes 15. The belt 19 is an ordinary belt designed for lawn mowing machines. The belt 19 contacts belt guides 20 during the short time span when the cutter annex 15 pivots up or down more than 5° in relation to the cutter head 5 for the purpose of keeping the belt 19 at sufficient tension through the angles of normal operation without the need for any automatic or self tensioning belt system. No belt rollers or pulley guides are required to protect the belt 19.

The nature of the belt 19, pulleys 11 and 18 and guide 20 ensures that the cutting device on the cutter annex 15 continues to operate while the annex 15 pivots through at least 40° (see FIG. 2) according to the terrain which is being cut. When the annexes 15 are horizontal the belt 19 passes through the pivot point 13/14 of the annexes 15 and cutter head 5 which allows the annexes 15 to easily pivot. During operation the annexes 15 follow the terrain in a similar fashion to that of the cutter head 5.

The rectangular guides 20 are positioned on the cutter annexes 15 adjacent to but not on the pivotal axis 13/14 so that when an annex 15 is raised to the vertical, the belt 19 is able to go slack to enable the belt 19 to be easily removed by hand from pulley 11 without the need to alter any adjustments or settings.

The simplicity of the arrangement or attachment of the annexes 15 to the cutter head 5 allows the cutter annexes 15 to be pivoted in an upright position for storage or easily removed when not required.

As seen in the drawings, covers 22 and 23 are used to cover the pulley system 10 for safety reasons as well as keeping the pulley system 10 relatively clean from debris.

The foregoing describes only one embodiment of the present invention, and modifications obvious to those skilled in the art can be made thereto without departing from the scope of the present invention.

What I claim is:

1. An attachment apparatus for a cutter head, said apparatus comprising:
 a frame having attachment means for pivotally attaching said frame to the cutter head defining a pivot axis, said frame having wheels for supporting said frame above ground level, said frame further including cutter means operable by a pulley apparatus including belt means and pulley means, said belt means connecting said cutter means of said frame to a separate cutter means on the cutter head and passing through guide means located adjacent said pivot axis on either said frame or the cutter head, wherein said pulley apparatus operates the cutter means of said frame over a variable range of angles as the frame pivots about said pivot axis and said belt means is able to be removed from said pulley means when the frame is pivoted approximately 90° to the horizontal, once said belt means is removed, said attachment means being detachable from the cutter head.

2. An attachment apparatus as claimed in claim 1, wherein said guide means are located on said frame and comprises a rectangular aperture to maintain said belt means at sufficient tension.

3. An attachment apparatus as claimed in claim 2, wherein said guide means ensures that said belt means remains on said pulley means while said frame pivots through an angle of at least 40°.

4. An attachment apparatus as claimed in claim 3, wherein said angle comprises 25° above the horizontal plane and 15° below the horizontal plane.

* * * * *